Nov. 8, 1955 P. A. GIORDANO 2,722,770
LIVE BAIT FLOATING PAIL
Filed March 4, 1954
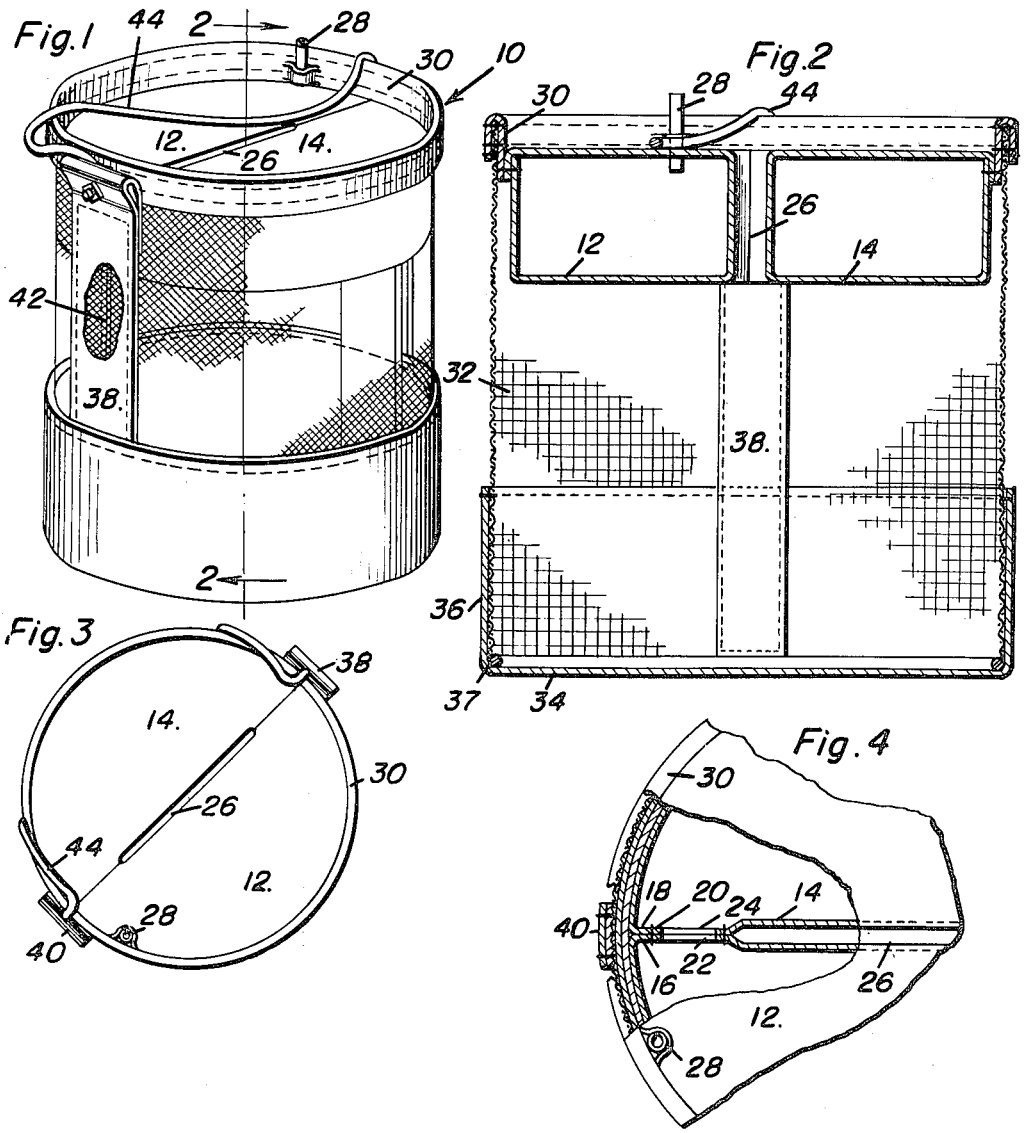
Peter A. Giordano
INVENTOR.

United States Patent Office 2,722,770
Patented Nov. 8, 1955

2,722,770

LIVE BAIT FLOATING PAIL

Peter A. Giordano, White Plains, N. Y.

Application March 4, 1954, Serial No. 414,031

7 Claims. (Cl. 43—55)

This invention relates to an article of fishing equipment and more particularly to a live bait pail.

The present invention resides in the provision of a live bait floating pail which may be readily suspended in a stream, lake, or other body of water, whether fresh water or salt water in such manner that the bait, though securely confined, will receive an adequate supply of oxygen by the waters moving through the open work construction of the bait pail.

A further object of this invention resides in the provision of a live bait floating pail which may be readily collapsed to a very small compass when not in use.

The construction of this invention especially features a pair of semi-cylindrical air cells which are arranged in abutting relationship and are secured together at their outer abutting walls. An access opening between the air cells is enlarged by deformation of the air cells at the center portions of the abutting walls so that they may be readily removed from the bait pail or positioned therein. Means are provided for inflating the air cells so as to substantially close the access opening as may be desired. The air cells insure the flotation of the live bait floating pail while water which may be splashed over the air cells readily drains downwardly therebetween thus insuring against the live bait floating pail being swamped or capsized.

One of the other features of the construction of this invention resides in the fact that the bottom of the live bait floating pail is preferably formed from an imperforate flexible material having a peripheral upwardly extending flange. This forms a container for a suitable quantity of water so that the live bait floating pail may be lifted from the body of water and temporarily carried from one location to another with the live bait therein until it is again deposited in the body of water.

Still further objects and features of this invention reside in the provision of a live bait floating pail that is strong and durable, simple in construction and manufacture, capable of being readily used in fresh or salt water, and which is comparatively inexpensive to construct.

These, together with the various ancillary objects and features of the invention which will become apparent as the following description proceeds, are attained by this live bait floating pail, a preferred embodiment of which have been illustrated in the accompanying drawings, by way of example only, wherein:

Figure 1 is a perspective view of the live bait floating pail comprising the present invention;

Figure 2 is an enlarged vertical sectional view as taken along the plane of line 2—2 in Figure 1;

Figure 3 is a top plan view of the live bait float pail; and

Figure 4 is a sectional detail view illustrating the manner in which the semi-cylindrical air cells are secured to each other yet communicate with each other.

With continuing reference to the accompanying drawings wherein like reference numerals designate similar parts throughout the various views, and with particular attention initially to Figures 1 through 4, it will be noted that reference numeral 10 generally designates a live bait floating pail comprising the present invention. This live bait floating pail consists of a pair of air cells 12 and 14 which are formed from a suitable imperforate, waterproof, flexible material such as any of the various readily available rubberized or plastic cloths. The semi-cylindrical air cells 12 and 14 are arranged with adjacent walls in abutting relationship as at 16 and 18. The adjacent walls 16 and 18 are stitched to each other or otherwise attached as at 20 adjacent the outer portions thereof. Aligned apertures 22 and 24 are formed in the air cells 12 and 14 so that the air cells communicate with each other. The air cells 12 and 14 are deformable so that at the center portions they may be pulled apart from each other to form an enlarged access opening as at 26. A flexible tubular conduit 28 is in communication with and attached to one of the air cells 12 so that the air cells may be inflated after they have been deformed so that they may be restored to shape so as to form a closure against access of the bait.

Secured to the air cells 12 and 14 is a cylindrical upwardly extending peripheral flange 30 which has an openwork container 32 attached thereto thus attaching the container 32 and depending it from the air cells 12 and 14.

The openwork container 32 has secured thereto and forming the bottom thereof an imperforate flexible member 34 which has attached thereto a peripherally upwardly extending flange 36. The bottom 34 may be rigidified, if desired, by a circular rib 37 made of wire or the like. Extending between and terminally secured to the flange 36 and the flange 30 are reinforcing members 38 and 40 of the same or similar flexible material from which the air cells 12 and 14 are constructed which overlie the seams as at 42 of the plastic wire mesh fabric from which the openwork container 32 is formed. Secured to the upper portions of the reinforcing members 38 and 40 is a suitable handle formed from a length of flexible material 44.

As it can be readily seen, the air cells 12 and 14 can be formed to part the center portion thereof to provide an access into the container portion 32. Then, after the bait has been deposited in the pail it may be lowered into a body of water, the air cells 12 and 14 have previously been inflated using the tubular conduit 28. When it is desired to change the location of the pail it is merely necessary to raise the pail using the handle 44. A suitable amount of water will be retained by the bottom 34 and the flange 36 thus permitting the bait to live while being moved. The flange 30 both provides an efficient and simple means for attaching the container 32 to the air cells 12 and 14 while also increasing the buoyancy of the pail 10. Further, any water which would be splashed upon the upper surface of the pail formed by the upper surface of the air cells 12 and 14 would pass therebetween as at 26 thus preventing the pail from being readily or easily capsized.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A live bait floating pail comprising a pair of semi-cylindrical air cells of flexible material arranged with adjacent walls in abutting relationship, said air cells being secured to each other only at the outermost portions of the abutting walls thereof, and said air cells being deformable to permit passage between said abutting walls at the center portions thereof, and an openwork cylindrical container attached to and depending from said air cells.

2. A live bait floating pail comprising a pair of semi-cylindrical air cells of flexible material arranged with adjacent walls in abutting relationship, said air cells being secured to each other only at the outermost portions of the abutting walls thereof, and said air cells being deformable to permit passage between said abutting walls at the center portions thereof, and an openwork cylindrical container attached to and depending from said air cells, said air cells having aligned openings therein forming an air passage between said air cells.

3. A live bait floating pail comprising a pair of semi-cylindrical air cells of flexible material arranged with adjacent walls in abutting relationship, said air cells being secured to each other only at the outermost portions of the abutting walls thereof, and said air cells being deformable to permit passage between said abutting walls at the center portions thereof, an openwork cylindrical container attached to and depending from said air cells, said air cells having aligned openings therein forming an air passage between said air cells, and an air inflation conduit secured to and in communication with said air cells for inflating said air cells.

4. A live bait floating pail comprising a pair of semi-cylindrical air cells of flexible material arranged with adjacent walls in abutting relationship, said air cells being secured to each other only at the outermost portions of the abutting walls thereof, and said air cells being deformable to permit passage between said abutting walls at the center portions thereof, an openwork cylindrical container attached to and depending from said air cells, said container including a bottom having a peripheral upwardly extending flange, said bottom and said flange being flexible and imperforate, and a plurality of reinforcing ribs of flexible material secured to and extending between said flange and said air cells.

5. A live bait floating pail comprising a pair of semi-cylindrical air cells of flexible material arranged with adjacent walls in abutting relationship, said air cells being secured to each other only at the outermost portions of the abutting walls thereof, and said air cells being deformable to permit passage between said abutting walls at the center portions thereof, an openwork cylindrical container attached to and depending from said air cells, said air cells having aligned openings therein forming an air passage between said air cells, an air inflation conduit secured to and in communication with said air cells for inflating said air cells, said container including a bottom having a peripheral upwardly extending flange, said bottom and said flange being flexible and imperforate, and a plurality of reinforcing ribs of flexible material secured to and extending between said flange and said air cells.

6. A live bait floating pail comprising an upper surface member formed of imperforate flexible material having an upwardly extending flange secured thereto, said upwardly extending flange being formed of imperforate flexible material, a central access opening through said surface member, and an openwork flexible container secured to and depending from said flange, said upper surface member being formed from a pair of semi-cylindrical air cells of flexible material arranged with adjacent walls in abutting relationship, said air cells being secured to each other only at the outermost portions of the abutting walls thereof, and said air cells being deformable to form said central access opening between said abutting walls at the center portions thereof.

7. A live bait floating pail comprising an upper surface member formed of imperforate flexible material having an upwardly extending flange secured thereto, said upwardly extending flange being formed of imperforate flexible material, a central access opening through said surface member, and an openwork flexible container secured to and depending from said flange, said upper surface member being formed from a pair of semi-cylindrical air cells of flexible material arranged with adjacent walls in abutting relationship, said air cells being secured to each other only at the outermost portions of the abutting walls thereof, said air cells being deformable to form said central access opening between said abutting walls at the center portions thereof, and said air cells having aligned openings therein forming an air passage between said air cells, an air inflating conduit secured to and in communication with said air cells for inflating said air cells, said container including a bottom having a peripheral upwardly extending flange, said bottom and said flange being flexible and imperforate, and a plurality of reinforcing ribs of flexible material secured to and extending between said flange and said air cells.

References Cited in the file of this patent

UNITED STATES PATENTS

| Number | Name | Date |
|---|---|---|
| 640,512 | Yeagla | Jan. 2, 1900 |
| 661,093 | Warren | Nov. 6, 1900 |
| 706,407 | Hall | Aug. 5, 1902 |
| 1,841,956 | Juergens | Jan. 19, 1932 |
| 2,241,314 | Mohler | May 6, 1941 |